US009002601B2

(12) United States Patent
Kabe et al.

(10) Patent No.: US 9,002,601 B2
(45) Date of Patent: Apr. 7, 2015

(54) SHIFT CONTROL APPARATUS OF CONTINUOUSLY VARIABLE TRANSMISSION (71) Applicant: Jatco Ltd, Fuji-shi, Shizuoka (JP)

(72) Inventors: Tomoaki Kabe, Nagoya (JP); Nobuhiko Morifuji, Okazaki (JP); Keisuke Ichikawa, Nagoya (JP); Nobuhide Kato, Kariya (JP); Yuki Ono, Okazaki (JP); Hiromu Ogino, Yamato (JP); Yukinobu Sakakibara, Gamagori (JP); Hisao Nakanishi, Ichinomiya (JP); Takahiro Nakata, Mishima (JP); Mitsuki Ishizuka, Isehara (JP)

(73) Assignee: Jatco Ltd, Fuji-shi (JP)

( * ) Notice: Subject to any disclaimer, the term of this patent is extended or adjusted under 35 U.S.C. 154(b) by 116 days.

(21) Appl. No.: 13/683,373

(22) Filed: Nov. 21, 2012

(65) Prior Publication Data

US 2013/0138309 A1    May 30, 2013

(30) Foreign Application Priority Data

Nov. 26, 2011  (JP) ................. 2011-258363

(51) Int. Cl.
G06F 7/00      (2006.01)
F16H 61/66     (2006.01)
F16H 61/662    (2006.01)
F16H 59/18     (2006.01)

(52) U.S. Cl.
CPC .......... *F16H 61/66* (2013.01); *F16H 61/66272* (2013.01); *F16H 59/18* (2013.01); *F16H 61/66254* (2013.01); *F16H 61/66259* (2013.01)

(58) Field of Classification Search
CPC .............. F16H 61/66259; F16H 61/66; F16H 61/66272; F16H 61/66254; F16H 59/18
USPC ....................................... 701/51, 58
See application file for complete search history.

(56) References Cited

U.S. PATENT DOCUMENTS

2003/0130779 A1 *  7/2003  Shiimado et al. ............... 701/65
2007/0099753 A1 *  5/2007  Matsui et al. .................. 477/44

FOREIGN PATENT DOCUMENTS

JP        2005-164000 A      6/2005

OTHER PUBLICATIONS

Machine Translation of JP 2005-164000.*

* cited by examiner

*Primary Examiner* — Thomas Tarcza
*Assistant Examiner* — Kevin Myhre
(74) *Attorney, Agent, or Firm* — Foley & Lardner LLP (57) ABSTRACT In a shift control apparatus of a continuously variable transmission (CVT) configured to steplessly vary a torque, the control apparatus employs an acceleration intention determination section for determining the presence or absence of a driver's acceleration intention, a shift mode setting section for setting a shift-control mode from a normal mode to an acceleration mode in the presence of the driver's acceleration intention, a shift speed setting section for setting a shift speed based on a target transmission ratio and a vehicle speed, and a shift control section for controlling a shift of the CVT. Also provided is a shift speed correction section for correcting the shift speed for an initial downshift in the acceleration mode to a shift speed slower than the shift speed set by the shift speed setting section, only when a demanded degree of the driver's acceleration intention is small.

7 Claims, 6 Drawing Sheets

FIG.4A
NORMAL MODE

FIG.4B
ACCELERATION MODE

FIG.5

FIG.6A IN CASE OF SMALL DEMANDED DEGREE OF DRIVER'S INTENTION TO ACCELERATE

FIG.6B

FIG.6C IN CASE OF BIG DEMANDED DEGREE OF DRIVER'S INTENTION TO ACCELERATE

FIG.6D

SHIFT CONTROL APPARATUS OF CONTINUOUSLY VARIABLE TRANSMISSION

TECHNICAL FIELD

The present invention relates to a shift control apparatus of a continuously variable transmission.

BACKGROUND ART

In recent years, there have been proposed and developed various automotive continuously variable transmissions (CVTs), for example, belt-drive continuously variable transmissions or toroidal continuously variable transmissions. In either a belt-drive CVT or a toroidal CVT, a speed ratio is controlled and varied responsively to a vehicle running state. For instance, a belt-drive CVT employs a primary variable-width pulley, a secondary variable-width pulley, and a drive belt (i.e., a segmented steel belt) running in the pair of variable-width pulleys. The CVT is configured such that torque, inputted from an internal combustion engine to the primary pulley, is transmitted via the drive belt to the secondary pulley, while steplessly varying a transmission ratio (in other words, a torque ratio) by changing the effective diameters of the primary and secondary pulleys. A shift control apparatus of the CVT is configured to utilize a shift characteristic diagram stored in a memory of a CVT control unit and set or preprogrammed based on simulations and experiments. Shift control is executed in accordance with a selected one of shift lines (shift patterns) defined by the shift characteristic diagram. For instance, in the case of a belt-drive CVT, a target primary-pulley rotational speed is set or determined, based on both the accelerator opening (the accelerator pedal position) and the vehicle speed, from a preprogrammed shift characteristic diagram. A target transmission radio (a target pulley ration) is determined based on the set target primary-pulley rotational speed. Then, shift control is executed by controlling the pulley groove width of each of the primary and secondary pulleys so that the actual pulley groove widths of the primary and secondary pulleys are brought into respective target pulley groove widths, corresponding to the determined target transmission ratio. On some shift control apparatus of CVTs, a CVT control unit is configured to determine, based on a driver's accelerator-pedal operation or a driver's accelerator manipulated variable (e.g., an accelerator pedal position changed by the driver and/or a driver's accelerator depression speed), whether or not there is a driver's intention to accelerate. When it is determined that a driver's intention to accelerate is present, switching from a normal shift line to a shift line suited for vehicle acceleration occurs, and thus a target transmission ratio is set or determined based on the shift line suited for vehicle acceleration. One such shift control apparatus of the CVT has been disclosed in Japanese Patent Provisional Publication No. 2005-164000 (hereinafter referred to as "JP2005-164000").

SUMMARY OF THE INVENTION

However, in the shift control apparatus as disclosed in JP2005-164000, immediately when predetermined parameters (namely, an accelerator opening and an accelerator depression speed) exceed their threshold values used for determining a driver's intention to accelerate, switching to a shift line suited for vehicle acceleration uniformly occurs. Even when a driver's intention to accelerate the vehicle is not so big, there is an increased tendency for a target transmission ratio to be undesirably set based on the shift line suited for vehicle acceleration immediately when the predetermined parameters exceed the respective threshold values. In such a case, the shift control apparatus tends to execute a bigger downshift than usual at almost the same shift speed as the presence of a bigger driver's intention to accelerate, even when the driver has not so big intention of accelerating the vehicle. Such an undesirably bigger downshift would likely give the driver a sudden unpleasant feeling. The avoidance of such a sudden unpleasant feeling would be desirable.

Accordingly, it is an object of the invention to provide a shift control apparatus of a continuously variable transmission, configured to determine a demanded degree of a driver's intention to accelerate an automotive vehicle, thereby avoiding a sudden unpleasant feeling caused by an undesirably bigger downshift.

In order to accomplish the aforementioned and other objects of the present invention, a shift control apparatus of a continuously variable transmission configured to steplessly vary a torque inputted from an engine to an input rotating member and configured to transmit the steplessly-varied torque to an output rotating member, comprises an acceleration intention determination section for determining whether a driver's acceleration intention is present or absent, a shift mode setting section for setting a shift-control mode of the continuously variable transmission to an acceleration mode in which a target rotational speed of the input rotating member is set to a higher rotational speed than that of a normal mode, when it has been determined that the driver's acceleration intention is present, a target transmission ratio setting section for setting a target transmission ratio based on an accelerator opening and a vehicle speed from a map provided for each of the normal mode and the acceleration mode, a shift speed setting section for setting a shift speed based on the target transmission ratio and the vehicle speed, a shift control section for controlling a shift of the continuously variable transmission based on at least the target transmission ratio and the shift speed set by the shift speed setting section, and a demanded degree determination section for determining a demanded degree of the driver's acceleration intention when the shift-control mode has been set to the acceleration mode, wherein the shift control section is also configured to execute a downshift in the acceleration mode at a shift speed slower than the shift speed set by the shift speed setting section, when it has been determined that the demanded degree of the driver's acceleration intention is lower than or equal to a predetermined value, and further configured to execute the downshift in the acceleration mode at the shift speed set by the shift speed setting section, when it has been determined that the demanded degree of the driver's acceleration intention is higher than the predetermined value.

The other objects and features of this invention will become understood from the following description with reference to the accompanying drawings.

BRIEF DESCRIPTION OF THE DRAWINGS

FIG. 4A is a shift characteristic diagram illustrating shift lines (shift patterns) in the normal mode, whereas

FIGS. 6A-6B are time charts illustrating a change in shift speed in the case of a small demanded degree of a driver's acceleration intention, whereas

DESCRIPTION OF THE PREFERRED EMBODIMENTS

Figure 1:
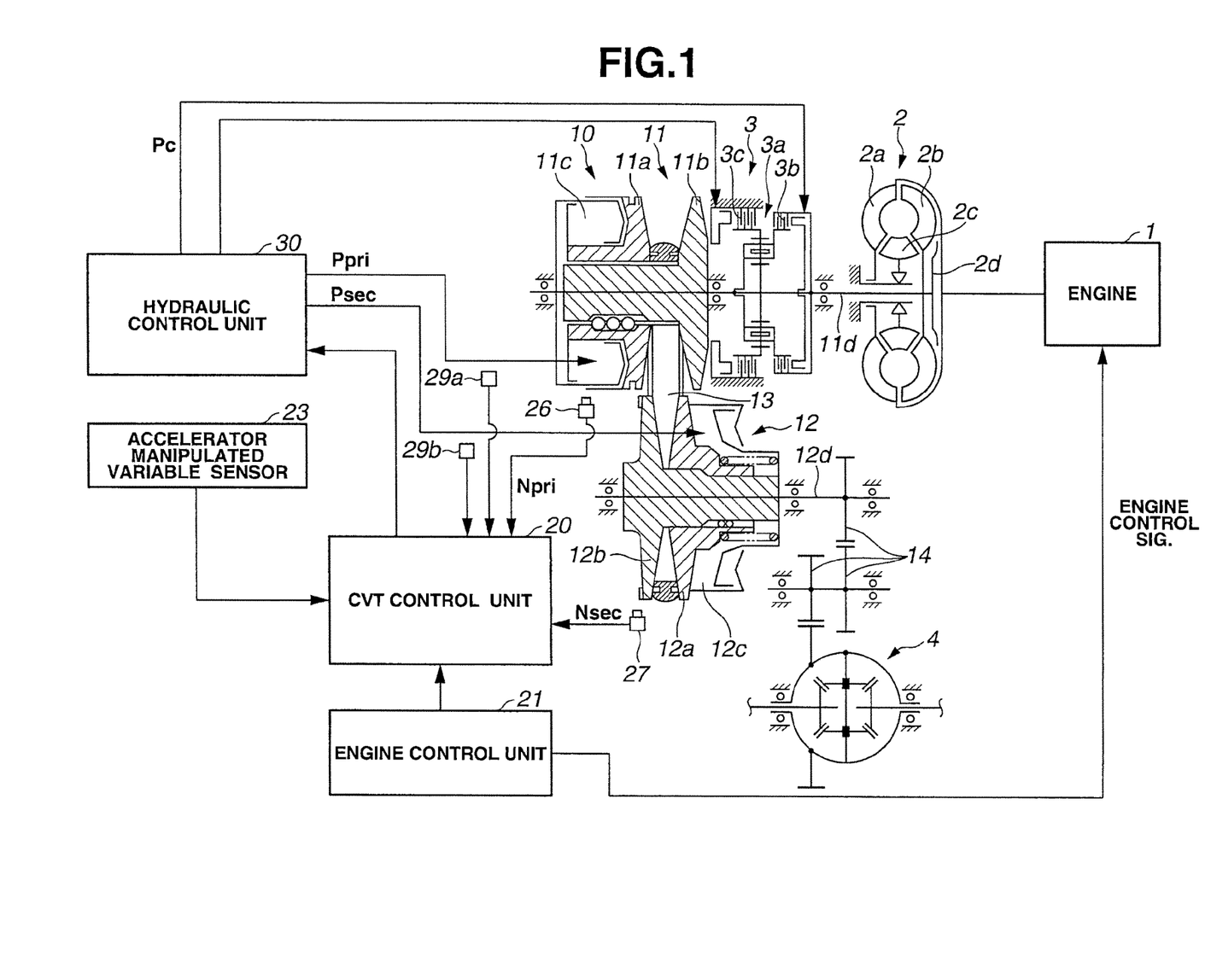
FIG. 1 is a system diagram illustrating an embodiment of a shift control apparatus of a belt-drive continuously variable transmission for use in an automotive vehicle.

Referring now to the drawings, particularly to FIG. 1, a continuously variable transmission (CVT) 10 of the embodiment is exemplified in an automotive belt-drive continuously variable automatic transmission with a torque converter. Continuously variable transmission 10 employs a primary variable-width pulley 11, a secondary variable-width pulley 12, a drive belt (i.e., a segmented steel belt) 13 running in the pair of variable-width pulleys 11-12, a CVT control unit 20, and a hydraulic control unit 30.

The rotation axis of primary pulley 11 is arranged coaxially with the axis of a crankshaft of an internal combustion engine 1. A torque converter 2 and a forward/reverse (F/R) changeover mechanism 3 are arranged in that order from the side of engine 1 and installed between the engine 1 and the primary pulley 11.

Torque converter 2 is equipped with a pump impeller 2a connected to the output shaft (the crankshaft) of engine 1, a turbine runner 2b connected to the input shaft of F/R changeover mechanism 3, a stator 2c, and a lockup clutch 2d.

F/R changeover mechanism 3 is mainly comprised of a double-pinion planetary gearset 3a. A sun gear of double-pinion planetary gearset 3a is connected to the turbine runner 2b of torque converter 2, while a carrier of double-pinion planetary gearset 3a is connected to the primary pulley 11. F/R changeover mechanism 3 is further equipped with a start-up clutch 3b provided for direct-coupling of the sun gear and the carrier of double-pinion planetary gearset 3a, and a reverse brake 3c provided for holding a ring gear of double-pinion planetary gearset 3a stationary. With the start-up clutch 3b engaged, and with the reverse brake 3c released, power flow (input rotation) from the engine 1 through the torque converter 2 is directly transmitted to the primary pulley 11, so that the primary pulley 11 turns in its normal-rotational direction. With the reverse brake 3c applied, and with the start-up clutch 3b disengaged, input rotation from the engine 1 through the torque converter 2 is reversed and transmitted to the primary pulley 11, so that the primary pulley 11 turns in its reverse-rotational direction.

Primary pulley 11 is an input-shaft side pulley (a driving pulley) for inputting rotation of the engine 1 to the CVT 10. Primary pulley 11 is equipped with a stationary conical flange 11b configured to be rotatable together with an input shaft 11d and a movable conical flange 11a configured to axially displaceable (slidable) by hydraulic pressure (i.e., a primary pressure Ppri) applied to a primary-pulley actuation cylinder chamber 11c. The movable flange 11a and the stationary flange 11b are arranged to be axially opposed to each other so as to form a V-shaped pulley groove whose width can be changed depending on the axial position of the movable flange 11a relative to the stationary flange 11b. As seen in FIG. 1, driving torque is transmitted from the engine 1 through the torque converter 2 via the F/R changeover mechanism 3 to the primary pulley 11. A rotational speed Npri of primary pulley 11 is detected by means of a primary-pulley rotational speed sensor 26.

Secondary pulley 12 is an output-side pulley (a driven pulley). Secondary pulley 12 is equipped with a stationary conical flange 12b configured to be rotatable together with an output shaft 12d and a movable conical flange 12a configured to axially displaceable (slidable) by hydraulic pressure (i.e., a secondary pressure Psec) applied to a secondary-pulley actuation cylinder chamber 12c. The movable flange 12a and the stationary flange 12b are arranged to be axially opposed to each other so as to form a V-shaped pulley groove whose width can be changed depending on the axial position of the movable flange 12a relative to the stationary flange 12b. As seen in FIG. 1, secondary pulley 12 is connected through gear and shaft components 14 (involving an idler gear and shaft and a countershaft and gear assembly) to a differential 4. Rotation (torque) transmitted from the primary pulley 11 through the drive belt 13 to the secondary pulley 12 is outputted to the differential 4. A rotational speed Nsec of secondary pulley 12 is detected by means of a secondary-pulley rotational speed sensor 27.

Drive belt 13, running in the primary and secondary pulleys 11-12, is provided to transmit rotation of the primary pulley 11 to the secondary pulley 12. A segmented steel belt is generally used as the drive belt 13. Note that the drive belt 13 is a "push belt" differing from a conventional V-belt configured to transmit torque by tension. That is, the drive belt 13 is configured to transmit torque by compression.

CVT control unit 20 is configured to determine a target transmission ratio (a target pulley ratio) and a belt contact pressure of the drive belt 13, and also configured to send command signals, corresponding to the determined target pulley ratio and belt contact pressure, to the hydraulic control unit 30 for controlling the CVT 10. Hereupon, the pulley ratio is a ratio of the effective radius of the secondary pulley 12 and the effective radius of the primary pulley 11, that is, a fraction obtained by dividing the effective radius of the secondary pulley 12 by the effective radius of the primary pulley 11. The pulley ratio is synonymous with a transmission ratio. CVT control unit 20 is further configured to send a command to the hydraulic control unit 30 for friction-element control of friction elements of F/R changeover mechanism 3 (i.e., engagement/disengagement control of start-up clutch 3b and application/release control of reverse brake 3c) and for engagement/disengagement control of lockup clutch 2d of torque converter 2.

Hydraulic control unit 30 is configured to control, responsively to a command from CVT control unit 20, both hydraulic pressure (i.e., primary pressure Ppri) applied to the primary-pulley actuation cylinder chamber 11c and hydraulic pressure (i.e., secondary pressure Psec) applied to the secondary-pulley actuation cylinder chamber 12c.

During operation of the CVT 10, wherein input rotation of the primary pulley 11 is transmitted through the drive belt 13 to the secondary pulley 12, and thus the primary and secondary pulleys 11-12 are rotating, the movable flange 11a axially slides along its rotation axis so that the axial position of movable flange 11a is determined depending on the primary pressure Ppri, while the movable flange 12a axially slides along its rotation axis so that the axial position of movable flange 12a is determined depending on the secondary pressure Psec. By virtue of sliding movement of each of movable flanges 11a-12a, the pulley groove widths of primary and secondary pulleys 11-12 are changed and thus drive belt 13 is radially squeezed on each of primary and secondary pulleys 11-12, so that the effective radius of primary pulley 11, corresponding to the point of friction contact between the primary-pulley groove and belt 13, and the effective radius of secondary pulley 12, corresponding to the point of friction contact between the secondary-pulley groove and belt 13, continuously vary. As a result, the pulley ratio (the transmission ratio) and the belt contact pressure of belt 13 can be controlled and adjusted to their desired values, determined based on the primary and secondary pressures Ppri and Psec.

Hydraulic control unit 30 is further configured to control, responsively to a command from CVT control unit 20, hydraulic pressure Pc to be supplied to F/R changeover mechanism 3, for engagement/disengagement control of start-up clutch 3b and application/release control of reverse brake 3c.

In a similar manner to engine control unit 21, CVT control unit 20 generally comprises a microcomputer. CVT control unit 20 includes an input/output interface (I/O), memories (RAM, ROM), and a microprocessor or a central processing unit (CPU). The input/output interface (I/O) of CVT control unit 20 receives input information from various engine/vehicle sensors and engine control unit 21, more concretely, an accelerator manipulated variable sensor 23, the primary-pulley rotational speed sensor 26, the secondary-pulley rotational speed sensor 27, and two hydraulic pressure sensors 29a-29b.

Engine control unit 21 is configured to output information about torque, inputted from the engine 1 to the CVT 10, to the CVT control unit 20.

Accelerator manipulated variable sensor 23 is configured to output informational data signals, indicating an accelerator manipulated variable (i.e., accelerator opening To or an accelerator pedal position) and a time rate-of-change (dTo/dt) in the detected accelerator manipulated variable To (that is, accelerator depression speed Tv), to the CVT control unit 20.

Primary-pulley rotational speed sensor 26 is configured to output a primary-pulley speed signal, indicating the rotational speed Npri of primary pulley 11, to the CVT control unit 20. On the other hand, secondary-pulley rotational speed sensor 27 is configured to output a secondary-pulley speed signal, indicating the rotational speed Nsec of secondary pulley 12, to the CVT control unit 20.

By the way, within the CVT control unit 20, the central processing unit (CPU) allows the access by the I/O interface of input informational data signals from the previously-discussed engine/vehicle sensors and the engine control unit 21. CVT control unit 20 is configured to calculate, based on both the primary-pulley speed signal Npri and the secondary-pulley speed signal Nsec, an actual pulley ratio (Npri/Nsec), in other words, an actual speed ratio (Nsec/Npri). CVT control unit 20 is further configured to estimate or specify a velocity of the automotive vehicle (i.e., a vehicle speed V) on the basis of the secondary-pulley speed signal Nsec.

Hydraulic pressure sensor 29a is configured to output a primary-pressure signal, indicating the hydraulic pressure (i.e., the primary pressure Ppri) applied to primary-pulley actuation cylinder chamber 11c, to the CVT control unit 20. On the other hand, hydraulic pressure sensor 29b is configured to output a secondary-pressure signal, indicating the hydraulic pressure (i.e., the secondary pressure Psec) applied to secondary-pulley actuation cylinder chamber 12c, to the CVT control unit 20.

Figure 2:
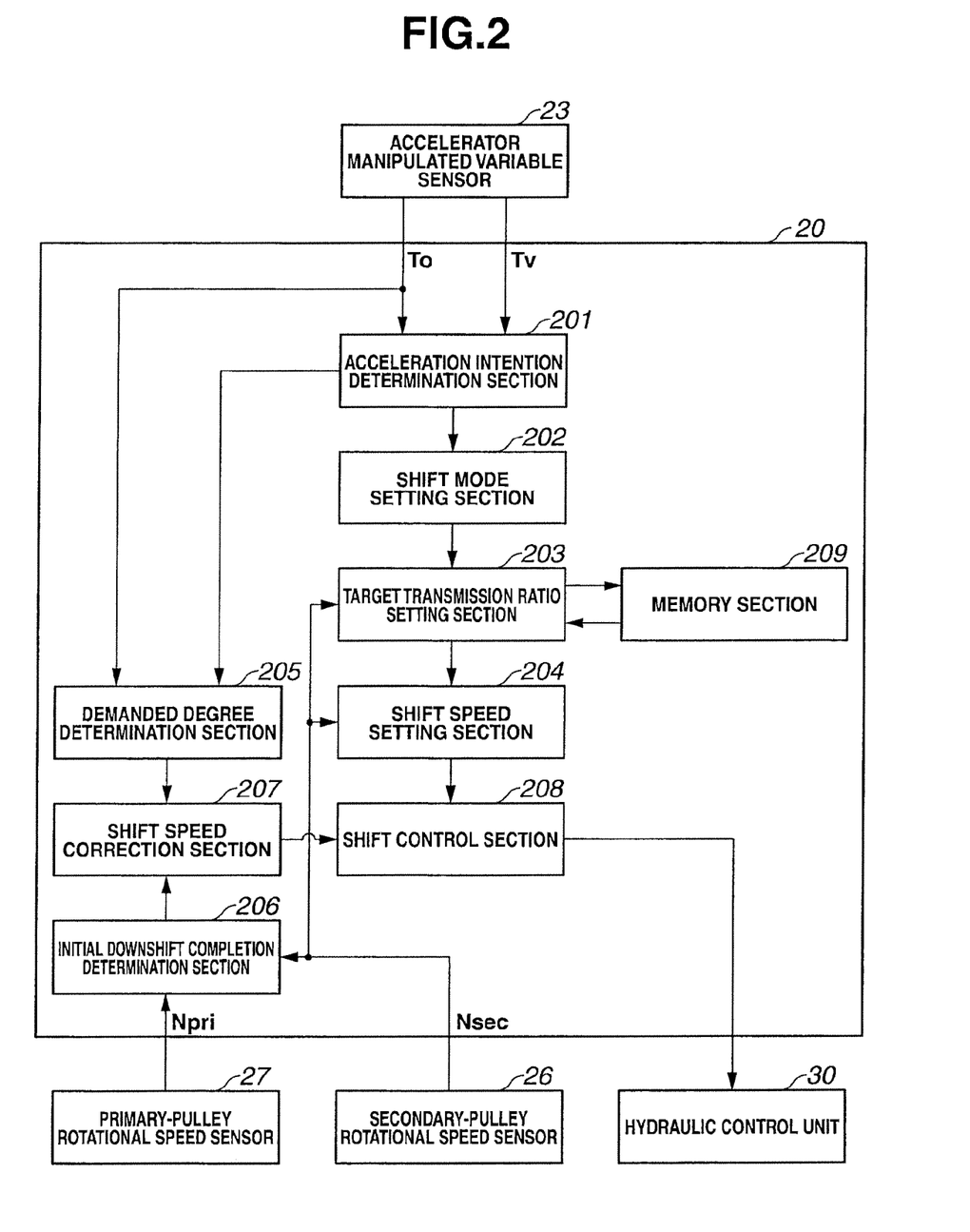
FIG. 2 is a block diagram illustrating a CVT control unit incorporated in the shift control apparatus of the embodiment.

Referring now to FIG. 2, there is shown the block diagram of CVT control unit 20.

As clearly shown in FIG. 2, CVT control unit 20 is equipped with an acceleration intention determination section 201, a shift mode setting section 202, a target transmission ratio setting section 203, a shift speed setting section 204, a demanded degree determination section 205, an initial downshift completion determination section 206, a shift speed correction section 207, a shift control section 208, and a memory section 209.

Acceleration intention determination section 201 is configured to determine, based on the accelerator opening To and accelerator depression speed Tv (=dTo/dt), a driver's intention to accelerate the automotive vehicle.

In the shown embodiment, map data (mode determination maps), which specify the relationship among accelerator opening To, accelerator depression speed Tv, a normal mode, and an acceleration mode, are predefined for every vehicle speeds V. Acceleration intention determination section 201 is configured to determine, based on latest up-to-date information about both the accelerator opening To and the accelerator depression speed Tv (=dTo/dt), a driver's intention to accelerate, while retrieving the mode determination map selected based on the current vehicle speed. The current vehicle speed is estimated from latest up-to-date information about the secondary-pulley rotational speed Nsec.

By the way, the predefined mode determination maps are stored in the memory section 209 of CVT control unit 20.

Shift mode setting section 202 is configured to set a shift mode of the CVT 10. When acceleration intention determination section 201 determines that a driver's intention to accelerate is present, a shift mode of the CVT 10 is set to an acceleration mode. Conversely when acceleration intention determination section 201 determines that a driver's intention to accelerate is absent, a shift mode of the CVT 10 is set to a normal mode.

Figure 3:
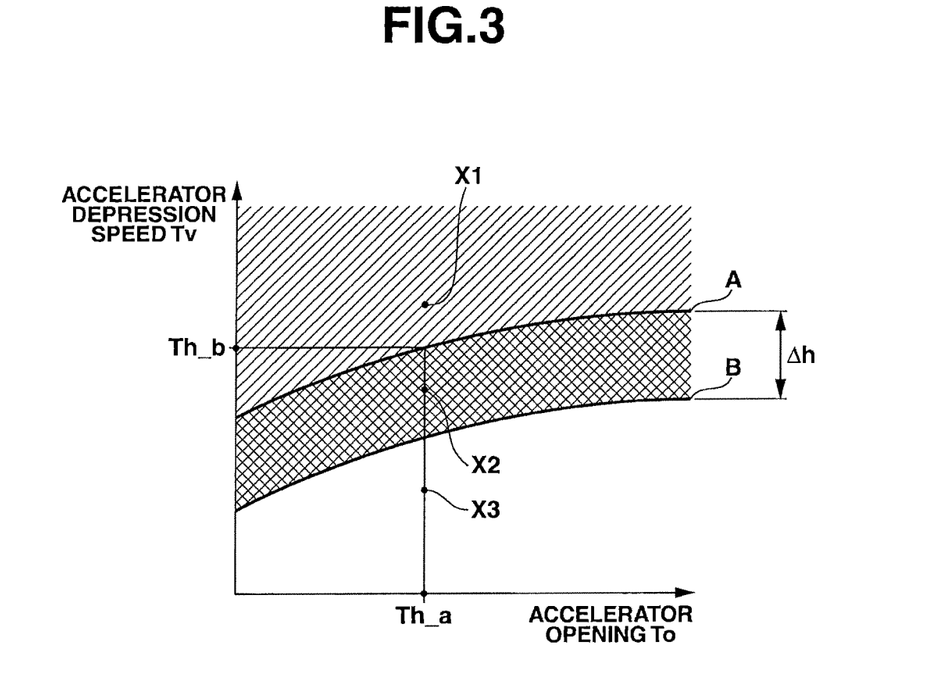
FIG. 3 is a diagram illustrating one example of a mode determination map showing the relationship among a threshold for determining a transition from a normal mode to an acceleration mode, a threshold for determining a transition from the acceleration mode to the normal mode, an accelerator opening, and an accelerator depression speed.

Referring to FIG. 3, there is shown one example of a plurality of mode determination maps stored in the memory section 209 of CVT control unit 20.

Concretely, the mode determination map shown in FIG. 3 specifies the relationship among a threshold value for determining a transition from the normal mode to the acceleration mode, a threshold value for determining a transition from the acceleration mode to the normal mode, accelerator opening To, and accelerator depression speed Tv, at any vehicle speed. In FIG. 3, a characteristic curve "A" is a normal-to-acceleration mode-transition determination characteristic curve, which is obtained by plotting threshold values for any accelerator opening To and any accelerator depression speed Tv. In FIG. 3, a characteristic curve "B" is an acceleration-to-normal mode-transition determination characteristic curve, which is obtained by plotting threshold values for any accelerator opening To and any accelerator depression speed Tv.

For instance, when latest up-to-date information (the coordinates) about accelerator opening To and accelerator depression speed Tv has been displaced or transferred to a point "X1" during the normal mode, acceleration intention determination section 201 determines that a driver's intention to accelerate is present, and thus shift mode setting section 202 sets a shift mode of the CVT 10 to an acceleration mode.

Also, when latest up-to-date information (the coordinates) about accelerator opening To and accelerator depression speed Tv has been displaced or transferred to a point "X2" between the normal-to-acceleration mode-transition determination characteristic curve "A" and the acceleration-to-normal mode-transition determination characteristic curve "B" during the normal mode, acceleration intention determination section 201 determines that a driver's intention to accelerate is absent, and thus shift mode setting section 202 maintains the shift mode of the CVT 10 at the normal mode, so that the normal mode remains unchanged.

In contrast, when latest up-to-date information (the coordinates) about accelerator opening To and accelerator depression speed Tv has been displaced or transferred to the point "X2" during the acceleration mode, shift mode setting section 202 maintains the shift mode of the CVT 10 at the acceleration mode, so that the acceleration mode remains unchanged. Also, when latest up-to-date information (the coordinates) about accelerator opening To and accelerator depression speed Tv has been displaced or transferred to a point "X3" during the acceleration mode, acceleration intention determination section 201 determines that a driver's intention to accelerate is absent, and thus a mode transition from the acceleration mode to the normal mode occurs through the shift mode setting section 202.

By the way, to avoid undesirable hunting and to suppress undesirably frequent mode transition, a hysteresis is provided in a mode transition (a mode shift) from one of a normal mode and an acceleration mode to the other (see a width or a difference $\Delta h$ between the normal-to-acceleration mode-transition determination characteristic curve "A" and the acceleration-to-normal mode-transition determination characteristic curve "B" in FIG. 3).

Target transmission ratio setting section 203 is configured to set or determine, based on latest up-to-date information about accelerator opening To and vehicle speed V, a target primary-pulley rotational speed Nt, from a shift mode map (a shift characteristic diagram) set or selected at the current execution cycle, and also configured to determine a target transmission ratio Rt (i.e., a target pulley ratio) based on the set target primary-pulley rotational speed Nt.

The shift mode maps (the shift characteristic diagrams), utilized by target transmission ratio setting section 203 for map-retrieval, are stored in the memory section 209. Concretely, memory section 209 stores both a shift characteristic diagram having shift lines (shift patterns) for the normal mode and a shift characteristic diagram having shift lines (shift patterns) for the acceleration mode.

Figure 4A:
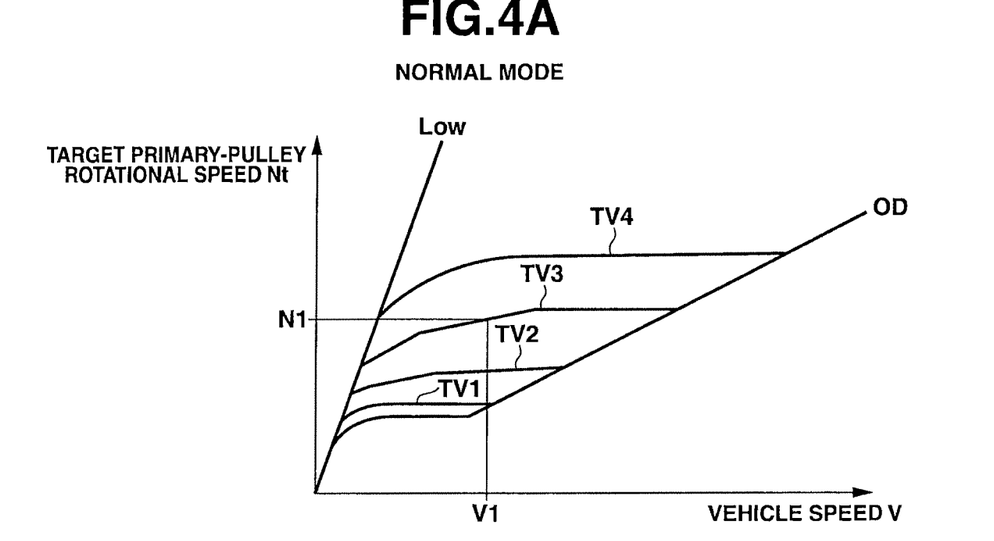
Figure 4B:
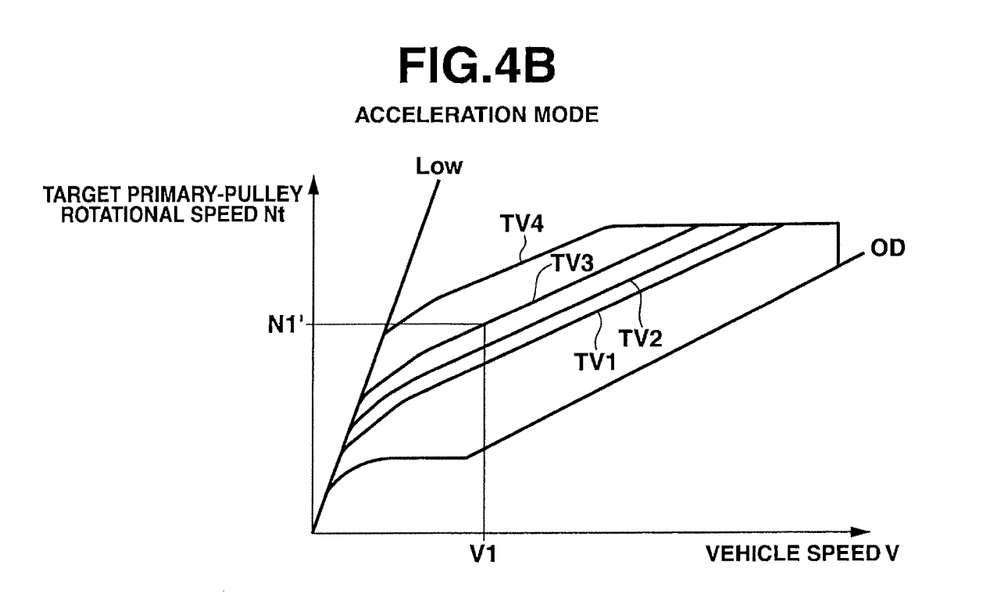
FIG. 4B is a shift characteristic diagram illustrating shift lines (shift patterns) in the acceleration mode.

Referring to FIGS. 4A-4B, there are shown two different shift characteristic diagrams. FIG. 4A shows the shift characteristic diagram for the normal mode, whereas FIG. 4B shows the shift characteristic diagram for the acceleration mode.

As seen from the shift characteristic diagrams of FIGS. 4A-4B, a plurality of characteristic lines (e.g., lines TV1, TV2, TV3, and TV4 in FIGS. 4A-4B), corresponding to respective accelerator openings varied depending on the degree of depression of the accelerator pedal, are preset or predefined between a characteristic line "Low" of a maximum transmission ratio and a characteristic line "OD" of a minimum transmission ratio. Therefore, target primary-pulley rotational speed Nt can be determined, based on latest up-to-date information about vehicle speed V and accelerator opening To, from a selected one of the two different shift characteristic diagrams of FIGS. 4A-4B.

As can be appreciated from comparison between the two different shift characteristic diagrams of FIGS. 4A-4B, target primary-pulley rotational speed Nt of the shift characteristic diagram for the acceleration mode (see FIG. 4B) is set to a higher rotational speed than that of the shift characteristic diagram for the normal mode (see FIG. 4A). Hence, target primary-pulley rotational speed Nt, set or determined during downshifting in the acceleration mode, tends to become higher than that of downshifting in the normal mode, thereby increasing the magnitude of input torque from the engine.

For instance, when the current accelerator opening To becomes an accelerator opening TV3 and the current vehicle speed V becomes a vehicle speed V1, a target primary-pulley rotational speed N1', determined by the shift characteristic diagram for the acceleration mode (see FIG. 4B), is set to become higher than a target primary-pulley rotational speed N1, determined by the shift characteristic diagram for the normal mode (see FIG. 4A).

Hence, when acceleration intention determination section 201 has determined that a driver's intention to accelerate is present during traveling of the vehicle at the vehicle speed V1, the acceleration mode becomes set. At the point of time, target primary-pulley rotational speed Nt is set or determined based on the shift characteristic diagram for the acceleration mode. As a result of this, target primary-pulley rotational speed Nt becomes the target primary-pulley rotational speed N1'. As discussed above, the target primary-pulley rotational speed N1' (see FIG. 4S) is a speed value higher than the target primary-pulley rotational speed N1 (see FIG. 4A), determined by the shift characteristic diagram for the normal mode, and thus a downshift starts from the point of time when the acceleration mode has been set or determined.

Shift speed setting section 204 is configured to set or determine a shift speed based on the determined target transmission ratio Rt (calculated by target transmission ratio setting section 203), the current vehicle speed V, and the current transmission ratio (the actual transmission ratio) Rc.

Demanded degree determination section 205 is configured to determine a demanded degree of the driver's acceleration intention after acceleration intention determination section 201 has determined that the driver's intention to accelerate is present.

Concretely, the accelerator depression speed Tv, calculated or generated at the point of time when acceleration intention determination section 201 has determined that the driver's intention to accelerate is present, is compared to a predetermined threshold value Th_c, which threshold value Th_c is determined based on the accelerator opening To calculated or generated at the same point of time. When the calculated accelerator depression speed Tv (=dTo/dt) is lower than or equal to the predetermined threshold value Th_c, that is, Tv≤Th_c, demanded degree determination section 205 determines that the demanded degree of the driver's acceleration intention is less than or equal to a predetermined value (a predetermined degree). Conversely when the calculated accelerator depression speed Tv (=dTo/dt) is higher than the predetermined threshold value Th_c, that is, Tv>Th_c, demanded degree determination section 205 determines that the demanded degree of the driver's acceleration intention is greater than the predetermined value (the predetermined degree). In the shown embodiment, the predetermined threshold value Th_c, used to determine whether a demanded degree of a driver's acceleration intention is small or big, is set to be greater than a predetermined threshold value Th_a (described later), used to determine whether a driver's acceleration intention is present or absent.

By the way, a determination result, obtained through the demanded degree determination section 205, is outputted to the shift speed correction section 207 (described later).

Initial downshift completion determination section 206 is configured to determine whether an initial downshift, occurring after the acceleration mode has been set by the shift mode setting section 202, has been completed. A determination result, obtained through the initial downshift completion determination section 206, is outputted to the shift speed correction section 207 (described later).

Concretely, immediately after the acceleration mode has been set or determined by the shift mode setting section 202, the current transmission ratio (the actual transmission ratio) Rc is calculated based on both the primary-pulley speed signal, indicating the rotational speed Npri of primary pulley 11 and detected by primary-pulley rotational speed sensor 26 and the secondary-pulley speed signal, indicating the rotational speed Nsec of secondary pulley 12 and detected by the secondary-pulley rotational speed sensor 27. Thereafter, when the calculated actual transmission ratio Rc becomes equal to the target transmission ratio Rt, calculated by target transmission ratio setting section 203, initial downshift completion determination section 206 determines that an initial downshift in the acceleration mode has been completed.

Shift speed correction section 207 is configured to determine, based on the demanded degree of the driver's acceleration intention at the point of time when the acceleration mode has been set or determined by the shift mode setting section 202, whether or not a shift speed correction is required during an initial downshift in the acceleration mode. In the case of a determination result that a shift speed correction is required during an initial downshift in the acceleration mode, a shift speed for the initial downshift in the acceleration mode is corrected.

Concretely, when demanded degree determination section 205 has determined that the demanded degree of the driver's acceleration intention is small (that is, $Tv \leq Th\_c$) and initial downshift completion determination section 206 has determined that an initial downshift in the acceleration mode has not yet been completed, shift speed correction section 207 determines that a shift speed correction during the initial downshift in the acceleration mode is required. In this situation, shift speed correction section 207 corrects the set shift speed, generated by the shift speed setting section 204, to a shift speed slower than the set shift speed.

Shift control section 208 is configured to output a command, which command is required for changing the current transmission ratio (the current pulley ratio) Rc toward the target transmission ratio Rt at the set shift speed (generated by the shift speed setting section 204), to the hydraulic control unit 30, and further configured to control both the primary and secondary pulleys 11-12 so as to realize the target transmission ratio Rt.

More concretely, in the presence of shift-speed-correction processing achieved by the shift speed correction section 207, shift control section 208 outputs a command for changing the current transmission ratio Rc toward the target transmission ratio Rt at the corrected shift speed (generated by the shift speed correction section 207). Conversely in the absence of shift-speed-correction processing achieved by the shift speed correction section 207, shift control section 208 outputs a command for changing the current transmission ratio Rc toward the target transmission ratio Rt at the set shift speed (generated by the shift speed setting section 204).

Figure 5:
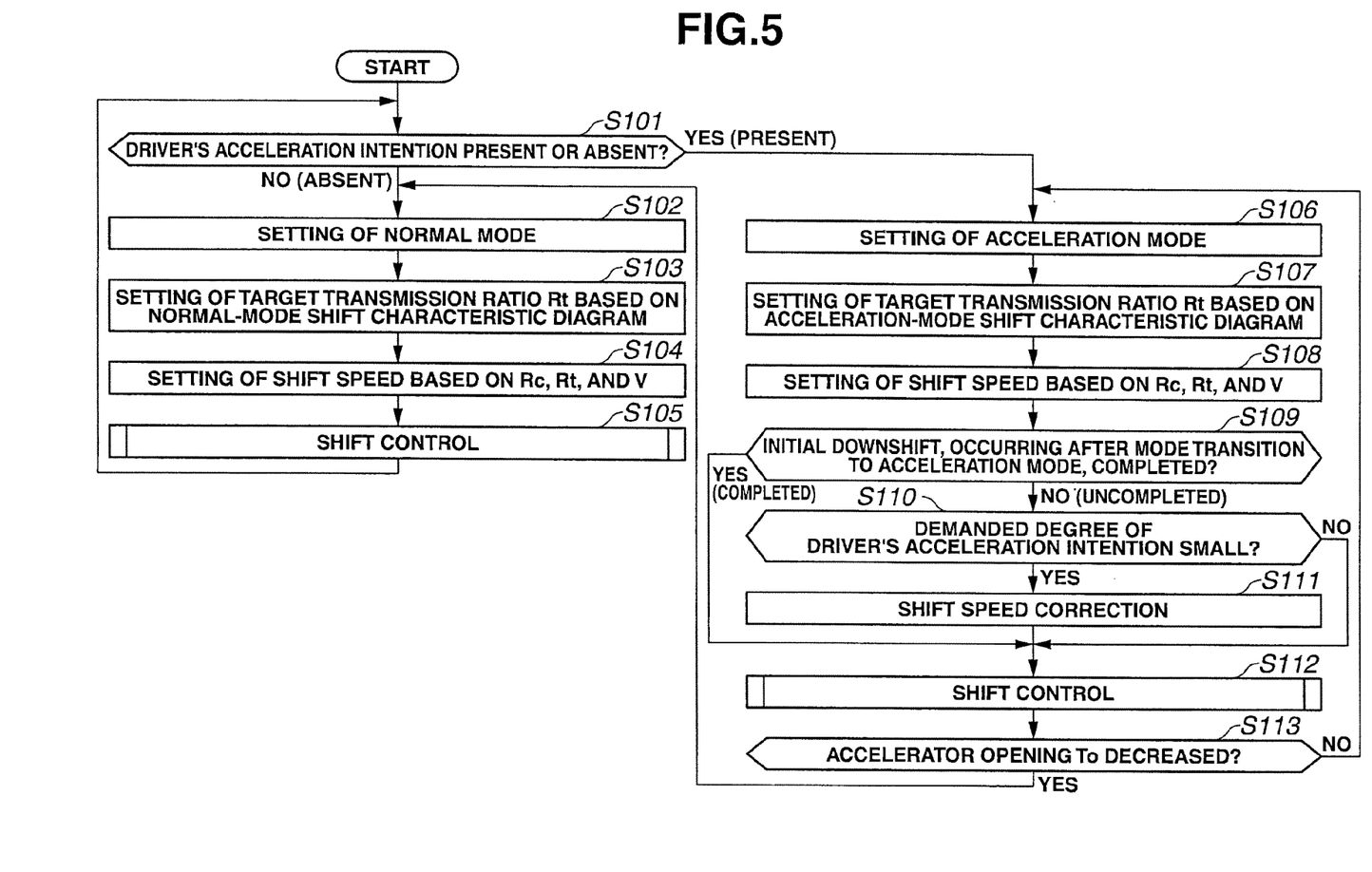
FIG. 5 is a flowchart illustrating shift-control processing executed within the CVT control unit.

Referring now to FIG. 5, there is shown the flowchart of the shift-control processing executed within the CVT control unit 20 incorporated in the shift control apparatus of the embodiment. Shift control procedures related to the essential part of the present invention will be hereinafter described in detail by reference to the flowchart of FIG. 5, while detailed description of the other general shift control procedures will be omitted for the sake of simplicity in the following discussion.

As discussed previously, regarding the shift modes used for the CVT 10, to which the shift control apparatus of the embodiment can be applied, there are two different shift modes, namely, a normal mode and an acceleration mode. In the acceleration mode, target primary-pulley rotational speed Nt is set to a higher rotational speed than that of the normal mode, so as to ensure a running performance that a higher priority is put on vehicle acceleration.

As a general rule or as a basic shift-control mode, shift control for the CVT 10 is performed in the normal mode. Only when it has been determined that a driver's accelerator-pedal operation or a driver's accelerator manipulated variable (e.g., an accelerator pedal position changed by the driver and/or a driver's accelerator depression speed) corresponds to a driver's vehicle-acceleration demand, the acceleration mode becomes set. Thereafter, shift control in the acceleration mode starts.

For the reasons discussed above, at step S101, a check is made to determine whether a driver's accelerator-pedal operation corresponds to a driver's vehicle-acceleration demand, that is, whether a driver's intention to accelerate is present or absent.

Concretely, a check is made to determine whether the current accelerator opening To is greater than or equal to a predetermined threshold value Th_a (i.e., $To \geq Th\_a$) and the current accelerator depression speed Tv is greater than or equal to a predetermined threshold value Th_b (i.e., $Tv \geq Th\_b$).

Hereupon, the predetermined threshold value Th_a is a variable, retrieved based on the current vehicle speed V from a predefined or preprogrammed V-Th_a map. On the other hand, the predetermined threshold value Th_b is a variable, retrieved based on the current vehicle speed V and the accelerator opening To corresponding to the current driver's accelerator-pedal operation (the current driver's accelerator-pedal depression), from a predefined or preprogrammed V-To-Th_b map.

Generally, when the vehicle is accelerated by the driver, an accelerator-pedal depressing amount (i.e., accelerator opening To) is different depending on whether the vehicle is in a low-speed driving state or in a high-speed driving state. When depressing the accelerator pedal for vehicle acceleration, an accelerator depression speed Tv is also different depending on the accelerator opening To. Hence, in the shown embodiment, the predetermined threshold value Th_a is specified by and retrieved from the predefined or preprogrammed V-Th_a map, showing how the predetermined threshold value Th_a has to be varied with respect to the vehicle speed V. On the other hand, the predetermined threshold value Th_b is specified by and retrieved from the predefined or preprogrammed V-To-Th_b map, showing how the predetermined threshold value Th_b has to be varied with respect to both the vehicle speed V and the accelerator opening To.

When a driver's intention to accelerate is present, the accelerator pedal is generally depressed by the driver. Thus, at step S101, the presence or absence of a driver's intention to accelerate is determined based on whether a predetermined condition, defined by two inequalities $To \geq Th\_a$ and $Tv \geq Th\_b$, is satisfied or unsatisfied.

In the shown embodiment, in the previously-discussed mode determination map (see FIG. 3), the relationship between the predetermined threshold value Th_a of accelerator opening To and the predetermined threshold value Th_b of accelerator depression speed Tv is specified by the normal-to-acceleration mode-transition determination characteristic curve "A". Immediately when the predetermined threshold value Th_a of accelerator opening To is map-retrieved and determined based on the current vehicle speed V, the predetermined threshold value Th_b of accelerator depression speed Tv can be determined based on the map-retrieved threshold value Th_a from the mode determination map (see FIG. 3).

For instance, when latest up-to-date information (the coordinates) about accelerator opening To and accelerator depression speed Tv has been displaced or transferred to a point "X1" (see FIG. 3), the predetermined condition, defined by two inequalities To≥Th_a and Tv≥Th_b, becomes satisfied. Hence, acceleration intention determination section 201 determines that a driver's intention to accelerate is present.

When the answer to step S101 is in the negative (NO), that is, when acceleration intention determination section 201 determines that a driver's intention to accelerate is absent, the routine proceeds from step S101 to step S102.

At step S102, shift mode setting section 202 sets the shift mode of the CVT 10 to a normal mode. At this time, if the normal mode has already been set as the shift-control mode, the normal mode becomes continuously set as the shift mode.

At step S103, target transmission ratio setting section 203 reads out the normal-mode shift characteristic diagram (see FIG. 4A) stored in the memory section 209, and then parameters, required for shift control, are set or determined based on the normal-mode shift characteristic diagram of FIG. 4A.

Concretely, target primary-pulley rotational speed Nt and target transmission ratio Rt at the current execution cycle, are both set or determined, based on both the current vehicle speed V and the current accelerator opening To, from the normal-mode shift characteristic diagram (see FIG. 4A).

For instance, assuming that the current vehicle speed V is a vehicle speed V1 and the current accelerator opening To is an accelerator opening TV3 during execution of shift control in the normal mode (see the normal-mode shift characteristic diagram of FIG. 4A), target primary-pulley rotational speed Nt becomes set to a target primary-pulley rotational speed N1.

At step S104, shift speed setting section 204 sets or determines a shift speed based on the current transmission ratio (the actual transmission ratio) Rc, the target transmission ratio Rt (set or determined through step S103), and the current vehicle speed V. The shift speed can be correlated with or regarded as a shifting time duration required before the actual transmission ratio Rc reaches the target transmission ratio Rt.

At step S105 subsequently to step S104, shift control section 208 determines both the primary pressure Ppri to be applied to the primary-pulley actuation cylinder chamber 11c of primary pulley 11 and the secondary pressure Psec to be applied to the secondary-pulley actuation cylinder chamber 12c of secondary pulley 12, for changing the current transmission ratio (the actual transmission ratio) Rc toward the target transmission ratio Rt at the set shift speed (set or determined through step S104). Then, shift control section 208 outputs a command, which command is required for realizing the determined primary pressure Ppri and the determined secondary pressure Psec, to the hydraulic control unit 30. Responsively to the command outputted from the shift control section 208 to the hydraulic control unit 30, the effective radius of primary pulley 11, corresponding to the point of friction contact between the primary-pulley groove and belt 13, and the effective radius of secondary pulley 12, corresponding to the point of friction contact between the secondary-pulley groove and belt 13, continuously vary. As a result, the pulley ratio (the transmission ratio) and the belt contact pressure of belt 13 can be controlled and adjusted to their desired values, determined based on the primary and secondary pressures Ppri and Psec.

In this manner, the actual transmission ratio Rc can be continuously steplessly varied toward the target transmission ratio Rt. Thereafter, at the point of time when the actual transmission ratio Rc has finally reached the target transmission ratio Rt, the shift-control procedure of step S105 terminates. Upon termination of the shift-control procedure of step S105, the routine returns to step S101, and thus (i) a decision on the presence or absence of a driver's intention to accelerate the vehicle, and (ii) shift control in a shift-control mode selected from the two different shift modes (namely, a normal mode and an acceleration mode) based on the result of decision on the presence or absence of the driver's acceleration intention are repeatedly performed.

Conversely when the answer to step S101 is in the affirmative (YES), that is, when acceleration intention determination section 201 determines that a driver's intention to accelerate is present, the routine proceeds from step S101 to step S106.

At step S106, shift mode setting section 202 sets the shift mode of the CVT 10 to an acceleration mode. At this time, if the normal mode has already been set as the shift-control mode, a mode transition to an acceleration mode, at which target primary-pulley rotational speed Nt is set to a higher rotational speed than that of the normal mode, takes place.

At step S107 subsequently to step S106, target transmission ratio setting section 203 reads out the acceleration-mode shift characteristic diagram (see FIG. 4B) stored in the memory section 209, and then parameters, required for shift control, are set or determined based on the acceleration-mode shift characteristic diagram of FIG. 4B.

Concretely, target primary-pulley rotational speed Nt and target transmission ratio Rt at the current execution cycle, are both set or determined, based on both the current vehicle speed V and the current accelerator opening To, from the acceleration-mode shift characteristic diagram (see FIG. 4B).

For instance, assuming that the current vehicle speed V is a vehicle speed V1 and the current accelerator opening To is an accelerator opening TV3 during execution of shift control in the acceleration mode (see the acceleration-mode shift characteristic diagram of FIG. 4B), target primary-pulley rotational speed Nt becomes set to a target primary-pulley rotational speed N1'.

At step S108, shift speed setting section 204 sets or determines a shift speed based on the current transmission ratio (the actual transmission ratio) Rc, the target transmission ratio Rt (set or determined through step S107), and the current vehicle speed V. The shift speed can be correlated with or regarded as a shifting time duration required before the actual transmission ratio Rc reaches the target transmission ratio Rt.

At step S109, a check is made to determine whether an initial downshift, occurring after a mode transition to the acceleration mode, has been completed. This check is accomplished by the initial downshift completion determination section 206.

Concretely, in the middle of the initial downshift, the actual transmission ratio Rc of the CVT is still changing toward the target transmission ratio Rt. Completion (termination) of the initial downshift is synonymous with the fact that the actual transmission ratio Rc has reached the target transmission ratio Rt.

For the reasons discussed above, at step S109, initial downshift completion determination section 206 determines whether the actual transmission ratio Rc becomes equal to the target transmission ratio Rt. That is, initial downshift completion determination section 206 compares the actual transmission ratio Rc with the target transmission ratio Rt. When the actual transmission ratio Rc becomes equal to the target transmission ratio Rt, initial downshift completion determination section 206 determines that the initial downshift has been completed. Conversely when the actual transmission ratio Rc is not equal to the target transmission ratio Rt, initial downshift completion determination section 206 determines that the initial downshift has not yet been completed.

When the answer to step S109 is in the negative (NO), that is, when step S109 (i.e., initial downshift completion determination section 206) determines that the initial downshift has not yet been completed, the routine proceeds to step S110.

At step S110, a check is made to determine whether a demanded degree of the driver's acceleration intention is small. The check is accomplished by means of the demanded degree determination section 205.

Concretely, in order to determine a demanded degree of the driver's acceleration intention, demanded degree determination section 205 compares the accelerator depression speed Tv, calculated or generated at the point of time when acceleration intention determination section 201 has determined that the driver's intention to accelerate is present, with the predetermined threshold value Th_c, which threshold value Th_c is determined based on the accelerator opening To calculated or generated at the same point of time (at the point of time of the affirmative (YES) answer to step S101).

In the shown embodiment, when the calculated accelerator depression speed Tv (=dTo/dt) is lower than or equal to the predetermined threshold value Th_c, that is, Tv≤Th_c, step S110 (i.e., demanded degree determination section 205) determines that the demanded degree of the driver's acceleration intention is small. Conversely when the calculated accelerator depression speed Tv (=dTo/dt) is higher than the predetermined threshold value Th_c, that is, Tv>Th_c, step S110 (i.e., demanded degree determination section 205) determines that the demanded degree of the driver's acceleration intention is big. Hereupon, the predetermined threshold value Th_c, used to determine whether a demanded degree of a driver's acceleration intention is small or big, is a variable, retrieved based on the accelerator opening To calculated or generated at the point of time when acceleration intention determination section 201 has determined that the driver's intention to accelerate is present, from a predefined or preprogrammed To-Th_c map. As previously described, the predetermined threshold value Th_c is set to be greater than the predetermined threshold value Th_a, used to determine whether a driver's acceleration intention is present or absent.

When step S110 (i.e., demanded degree determination section 205) determines that the demanded degree of the driver's acceleration intention is small (that is, Tv≤Th_c), the routine proceeds to step Sill.

At step S111, a shift speed correction is executed by means of the shift speed correction section 207.

Concretely, within the shift speed correction section 207, a corrected shift speed is arithmetically calculated by multiplying the shift speed, set through step S108, by a correction coefficient "k". Hereupon, the correction coefficient "k", used for correcting the set shift speed (generated by the shift speed setting section 204) to a lower speed, is a variable, retrieved based on the current accelerator opening To and the current accelerator depression speed Tv from a predefined or preprogrammed To-Tv-k map.

Hence, in the shown embodiment, by virtue of the shift-speed-correction processing of step S111, the shift speed can be finally corrected to a shift speed slower than the set shift speed (generated by the shift speed setting section 204 and set at step S108).

By the way, the reason for determining the presence or absence of completion of an initial downshift, occurring after a mode transition to the acceleration mode, through step S109, is that execution of a shift speed correction is permitted (enabled) only during the initial downshift occurring after the mode transition to the acceleration mode.

At step S112 subsequently to step S111, shift control section 208 determines both the primary pressure Ppri to be applied to the primary-pulley actuation cylinder chamber 11c and the secondary pressure Psec to be applied to the secondary-pulley actuation cylinder chamber 12c. Then, shift control section 208 outputs a command, which command is required for realizing the determined primary pressure Ppri and the determined secondary pressure Psec, to the hydraulic control unit 30. Responsively to the command outputted from the shift control section 208 to the hydraulic control unit 30, the effective radius of primary pulley 11, corresponding to the point of friction contact between the primary-pulley groove and belt 13, and the effective radius of secondary pulley 12, corresponding to the point of friction contact between the secondary-pulley groove and belt 13, continuously vary. As a result, the pulley ratio (the transmission ratio) and the belt contact pressure of belt 13 can be controlled and adjusted to their desired values, determined based on the primary and secondary pressures Ppri and Psec.

In this manner, the actual transmission ratio Rc can be continuously steplessly varied toward the target transmission ratio Rt. Thereafter, at the point of time when the actual transmission ratio Rc has finally reached the target transmission ratio Rt, the shift-control procedure of step S112 terminates.

In the shown embodiment, when it has been determined that a demanded degree of the driver's acceleration intention at the point of time when a mode transition to the acceleration mode has occurred is small, that is, in the case of the affirmative (YES) answer to step S110, a shift speed for an initial downshift, occurring after the mode transition to the acceleration mode, is corrected to a shift speed slower than the shift speed set at step S108 and generated by the shift speed setting section 204 (see the shift-speed-correction processing executed at step S111).

By virtue of the previously-discussed appropriate correction to the set shift speed during transmission-ratio changing, exactly, during downshifting in the acceleration mode, it is possible to slow down a rise in rotational speed Npri of primary pulley 11, in other words, an engine-speed rise. This eliminates or prevents any sudden unpleasant feeling that the driver experiences an uncomfortable engine speed rise during downshifting.

Upon termination of the shift-control procedure of step S112, the routine proceeds to step S113.

At step S113, a check is made to determine whether accelerator opening To has decreased.

Concretely, when the current accelerator opening To is less than a predetermined threshold value Th_d, that is, To<Th_d, it is determined that accelerator opening To has decreased.

Hereupon, the predetermined threshold value Th_d, used to determine whether accelerator opening To has decreased, is a variable, retrieved based on the current vehicle speed V and the accelerator opening To, which opening corresponds to the current driver's accelerator-pedal depression detected at step S101 and calculated or generated at the point of time when acceleration intention determination section 201 has determined that the driver's intention to accelerate is present, from a predefined or preprogrammed V-To-Th_d map. The relationship between accelerator opening To and predetermined threshold value Th_d for determining a decrease in accelerator opening To, at any vehicle speed, is specified by the previously-discussed mode determination map shown in FIG. 3.

By the way, the predetermined threshold value Th_d, used to determine whether accelerator opening To has decreased, is set to be less than the predetermined threshold value Th_a, used to determine whether a driver's acceleration intention is present or absent.

The affirmative answer to step S113, that is, the decision result that accelerator opening To has decreased, means that the accelerator pedal has already been released by the driver.

This also means that a driver's acceleration intention has disappeared. Hence, the routine returns to step S102 so that the normal mode is set again.

In contrast, the negative answer to step S113, that is, the decision result that accelerator opening To has not yet decreased, means that the driver continuously depresses the accelerator pedal. In such a case, in order to continuously execute shift control in the acceleration mode, the routine returns to step S106.

Hereinafter described in detail by reference to FIGS. 5, 6A-6B, and 6C-6D are different shift speeds for downshifting, changed depending on a demanded degree of a driver's acceleration intention.

Figures 6A, 6B:
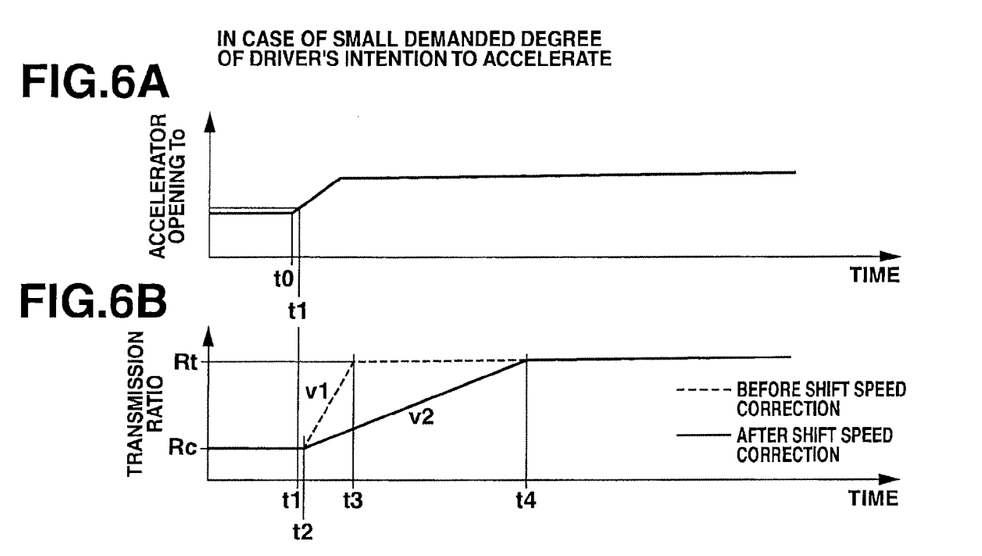
Figures 6C, 6D:
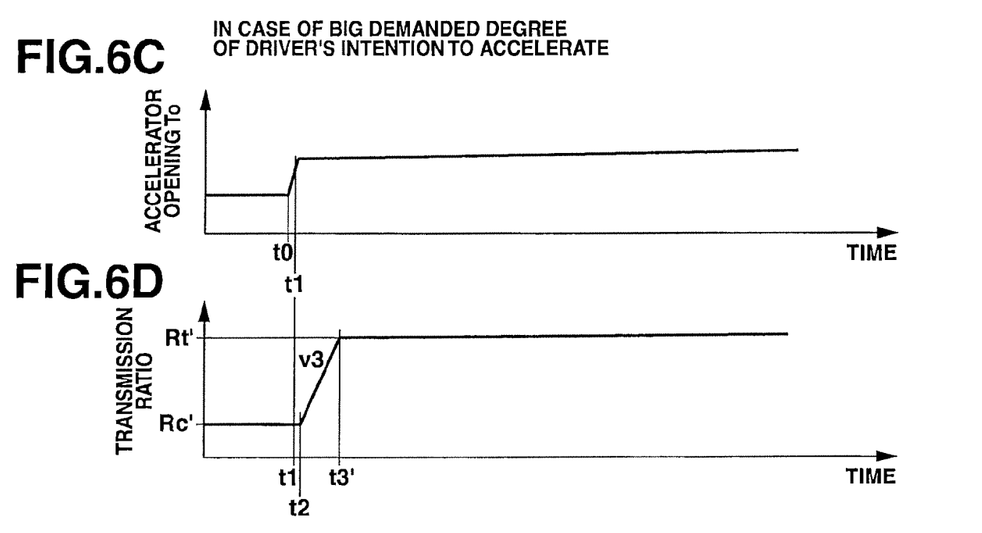
FIGS. 6C-6D are time charts illustrating a change in shift speed in the case of a big demanded degree of a driver's acceleration intention.

FIGS. 6A-6B are time charts illustrating a moderate change in accelerator opening To and a change in actual transmission ratio Rc in the case of a small demanded degree of a driver's acceleration intention, whereas FIGS. 6C-6D are time charts illustrating a steep change in accelerator opening To and a change in actual transmission ratio Rc in the case of a big demanded degree of a driver's acceleration intention.

During constant-speed driving under an accelerator-pedal depressed state where accelerator opening To is held approximately constant, the decision result of step S101 of FIG. 5 becomes negative (NO). Under this condition, within the CVT 10, shift control in the normal mode is executed.

Assume that a driver's accelerator-pedal depression at the time t0 is detected at the time t1 and the accelerator opening To at the point of time t1 is greater than or equal to a predetermined threshold value Th_a and the accelerator depression speed Tv is greater than or equal to a predetermined threshold value Th_b. At this time, the decision result of step S101 of FIG. 5 becomes affirmative (YES), and thus the shift mode of the CVT 10 becomes switched from the normal mode to the acceleration mode.

Immediately after a mode transition from the normal mode to the acceleration mode has occurred, target transmission ratio Rt is set or determined based on both the vehicle speed V and the accelerator opening To at the point of time t1 from the acceleration-mode shift characteristic diagram shown in FIG. 4B (see step S107). Then, a shift speed is set or determined based on the actual transmission ratio Rc, the target transmission ratio Rt, and the current vehicle speed V (see step S108).

By the way, at this time, as shown in FIG. 6B, a shift speed that enables or permits the actual transmission ratio Rc at this point of time t2 to reach to the target transmission ratio Rt during the time duration (t2-t3) from the time t2 to the time t3 is set. The set shift speed at this point of time t2 corresponds to a shift speed that the actual transmission ratio Rc changes along the broken line "v1" of FIG. 6B, that is, a gradient dRc/dt of the broken line "v1" of FIG. 6B.

By the way, the point of time t2 when the shift speed has been set, corresponds to a point of time immediately after the mode transition to the acceleration mode. Hence, an initial downshift in the acceleration mode has not yet been completed. For the reasons discussed above, the decision result of step S109 of FIG. 5 becomes negative (NO), and thereafter a demanded degree of the driver's acceleration intention is checked for through step S110.

When the specific condition that the accelerator depression speed Tv, generated at the point of time t1 when step S101 (i.e., acceleration intention determination section 201) has determined that the driver's intention to accelerate is present, is lower than or equal to the predetermined threshold value Th_c, that is, Tv≤Th_c, is satisfied, the decision result of step S110 of FIG. 5 becomes affirmative (YES). That is, step S110 (i.e., demanded degree determination section 205) determines that the demanded degree of the driver's acceleration intention is small.

Hence, at step S111 subsequently to step S110, the shift speed (corresponding to the gradient dRc/dt of the broken line "v1" of FIG. 6B), set through step S108, is corrected and changed to a shift speed slower than the set shift speed.

Concretely, the set shift speed (corresponding to the gradient dRc/dt of the broken line "v1" of FIG. 6B) is corrected or changed to a shift speed that enables or permits the actual transmission ratio Rc at this point of time t2 to reach to the target transmission ratio Rt during the time duration (t2-t4) from the time t2 to the time t4. The corrected shift speed at this point of time t2 corresponds to a shift speed that the actual transmission ratio Rc changes along the solid line "v2" of FIG. 6B, that is, a gradient dRc/dt of the solid line "v2" of FIG. 6B.

By the way, the shift-speed-correction processing is made by multiplying the shift speed, set through step S108, by the previously-discussed correction coefficient "k". The correction coefficient "k" is set or determined based on at least the accelerator opening To at the point of time t1 when step S101 has determined that the driver's intention to accelerate is present (exactly, based on the accelerator opening To and the accelerator depression speed Tv at the point of time t1 when step S101 has determined that the driver's intention to accelerate is present).

Correcting the set shift speed to a slower shift speed means that a shifting time duration becomes lengthened (see the time duration t2-t4 in FIG. 6B) in comparison with the shifting time duration (see the time duration t2-t3 in FIG. 6B) initially set immediately after the mode transition to the acceleration mode (see the flow from step S111 to step S112).

That is, when the demanded degree of the driver's acceleration intention is small, a shift speed for an initial downshift in the acceleration mode becomes slower (see the moderate gradient of the solid line "v2" in comparison with the steep gradient of the broken line "v1" in FIG. 6B). This contributes to an appropriate rise in engine speed for the corrected shifting time duration t2-t4 longer than the initially-set shifting time duration t2-t3.

From the second downshift after the mode transition to the acceleration mode, the decision result of step S109 of FIG. 5 becomes affirmative (YES) and thus the routine jumps from step S109 to step S112. That is, the shift speed, set through step S108, is not corrected.

When the accelerator pedal has been released after the mode transition to the acceleration mode, the decision result of step S113 of FIG. 5 becomes affirmative (YES), and thus the routine returns to step S102, so that the shift-control mode is returned to the normal mode.

Conversely when a demanded degree of the driver's acceleration intention at the point of time when a mode transition to the acceleration mode has occurred is big and thus the specific condition that the accelerator depression speed Tv, generated at the point of time t1 when step S101 (i.e., acceleration intention determination section 201) has determined that the driver's intention to accelerate is present, is lower than or equal to the predetermined threshold value Th_c, that is, Tv≤Th_c, is unsatisfied, the decision result of step S110 of FIG. 5 becomes negative (NO) and thus the routine jumps from step S110 to step S112. Thus, the shift speed, set through step S108, is not corrected.

In this case, the shift speed, which speed has been set to enable or permit the actual transmission ratio Rc at this point of time t2 to reach to the target transmission ratio Rt during the time duration (t2-t3) from the time t2 to the time t3, corresponding to the shift speed that the actual transmission ratio Rc changes along the broken line "v1" of FIG. 6B, that is, the gradient dRc/dt of the broken line "v1" of FIG. 6B, is not corrected. Hence, downshifting control of step S112 is executed at the shift speed that the actual transmission ratio Rc changes along the broken line "v1" of FIG. 6B.

In the shown embodiment, the shift speed is set to become faster, as the accelerator-pedal depression speed (accelerator depression speed Tv) becomes faster. Therefore, assume that a demanded degree of the driver's acceleration intention at the point of time when a mode transition to the acceleration mode has occurred is small and thus the specific condition that the accelerator depression speed Tv, generated at the point of time when step S101 has determined that the driver's intention to accelerate is present, is lower than or equal to the predetermined threshold value Th_c, that is, Tv≤Th_c, is satisfied, but the accelerator depression speed Tv becomes closer to the predetermined threshold value Th_c. In such a case, the corrected shift speed becomes set to a shift speed faster than the shift speed that the actual transmission ratio Rc changes along the solid line "v2" of FIG. 6B, as the accelerator depression speed Tv approaches closer to the predetermined threshold value Th_c.

In contrast, assume that a demanded degree of the driver's acceleration intention at the point of time when a mode transition to the acceleration mode has occurred is big and thus the specific condition that the accelerator depression speed Tv, generated at the point of time when step S101 has determined that the driver's intention to accelerate is present, is lower than or equal to the predetermined threshold value Th_c, that is, Tv≤Th_c, is unsatisfied, in other words, the accelerator depression speed Tv is higher than the predetermined threshold value Th_c, that is, Tv>Th_c. For instance, as shown in FIG. 6D, a shift speed that enables or permits the actual transmission ratio Rc' at this point of time t2 to reach to the target transmission ratio Rt' during the time duration (t2-t3') from the time t2 to the time t3' is set by means of the shift speed setting section 204. The set shift speed at this point of time t2 corresponds to a shift speed that the actual transmission ratio Rc' changes along the solid line "v3" of FIG. 6D, that is, a gradient dRc'/dt of the solid line "v3" of FIG. 6D. In this case, the demanded degree of the driver's acceleration intention is big, and hence the shift speed, set through step S108 (by means of the shift speed setting section 204), is not corrected (see the flow from step S108 through steps S109-S110 to step S112 in FIG. 5). Thus, the shift speed, which speed has been set to enable or permit the actual transmission ratio Rc' at this point of time t2 to reach to the target transmission ratio Rt' during the time duration (t2-t3') from the time t2 to the time t3' (i.e., the shift speed that the actual transmission ratio Rc' changes along the solid line "v3" of FIG. 6D), remains unchanged. Hence, downshifting control of step S112 is executed at the shift speed that the actual transmission ratio Rc' changes along the solid line "v3" of FIG. 6D.

As set out above, according to the shift control apparatus of the embodiment, the demanded degree of a driver's acceleration intention is determined by the result of comparison between accelerator depression speed Tv and its predetermined threshold value Th_c. The shift speed for the initial downshift in the acceleration mode when it has been determined that the demanded degree of the driver's acceleration intention is small (i.e., Tv≤Th_c), is corrected to a shift speed slower than the shift speed for the initial downshift in the acceleration mode when it has been determined that the demanded degree of the driver's acceleration intention is big (i.e., Tv>Th_c).

Thus, it is possible to prevent an undesirably bigger downshift (in other words, an undesirably rapider engine-speed rise than that required or intended by the driver) from giving the driver a sudden unpleasant feeling about the engine behavior.

In the shown embodiment described previously, in the shift control apparatus (CVT control unit 20) of the continuously variable transmission (CVT 10) configured to steplessly vary a torque inputted from an engine 1 to an input rotating member (primary pulley 11) and configured to transmit the steplessly-varied torque to an output rotating member (secondary pulley 12), the shift control apparatus (CVT control unit 20) includes an acceleration intention determination section 201 for determining whether a driver's acceleration intention is present or absent, a shift mode setting section 202 for setting a shift-control mode of the CVT 10 to an acceleration mode in which a target rotational speed Nt of the input rotating member (primary pulley 11) is set to a higher rotational speed than that of a normal mode, when it has been determined that the driver's acceleration intention is present, a target transmission ratio setting section 203 for setting a target transmission ratio Rt based on an accelerator opening To and a vehicle speed V from a map (i.e., the normal-mode shift characteristic diagram of FIG. 4A and the acceleration-mode shift characteristic diagram of FIG. 4B) provided for each of the normal mode and the acceleration mode, a shift speed setting section 204 for setting a shift speed based on the target transmission ratio Rt and the vehicle speed V, a shift control section 208 for controlling a shift of the CVT 10 based on at least the target transmission ratio Rt and the shift speed set by the shift speed setting section 204, and a demanded degree determination section 205 for determining a demanded degree (i.e., accelerator depression speed Tv) of the driver's acceleration intention when the shift-control mode has been set to the acceleration mode. The shift control section 208 is also configured to execute a downshift in the acceleration mode at a shift speed slower than the shift speed set by the shift speed setting section 204, when it has been determined that the demanded degree of the driver's acceleration intention is lower than or equal to a predetermined value (i.e., Tv≤Th_c), and further configured to execute the downshift in the acceleration mode at the shift speed set by the shift speed setting section 204, when it has been determined that the demanded degree of the driver's acceleration intention is higher than the predetermined value (i.e., Tv>Th_c).

With the previously-discussed shift-control system configuration, the shift speed for a downshift in the acceleration mode tends to slow down, when the demanded degree of the driver's acceleration intention is small (i.e., Tv≤Th_c). Thus, it is possible to prevent an undesirably bigger downshift (in other words, an undesirably rapider engine-speed rise than that required or intended by the driver) from occurring, thereby preventing or suppressing any sudden unpleasant feeling that the driver experiences an uncomfortable engine speed rise during downshifting in the acceleration mode.

In the shown embodiment, the normal-mode shift characteristic diagram (see FIG. 4A) is preset or preprogrammed, while aiming at both improved vehicle fuel economy and reduced exhaust emission gases. On the other hand, the acceleration-mode shift characteristic diagram (see FIG. 4B) is preset or preprogrammed so as to ensure a running performance that a higher priority is put on power performance (in particular, acceleration performance), while somewhat sacrificing improved vehicle fuel economy and/or reduced exhaust emission gases, in comparison with the normal mode.

Hence, in the case that the demanded degree of the driver's acceleration intention is small (i.e., Tv≤Th_c), the shift control apparatus of the embodiment can reconcile both improved vehicle fuel economy and reduced exhaust emission gases, while preventing an undesirably bigger downshift from giving the driver a sudden unpleasant feeling by slowing down or appropriately suppressing a flare-up of engine revolution speed during downshifting in the acceleration mode.

As previously described, in order to avoid undesirable hunting and to suppress undesirably frequent mode transition between the normal mode and the acceleration mode, a hysteresis Δh is provided (see the difference Δh between the normal-to-acceleration mode-transition determination characteristic curve "A" and the acceleration-to-normal mode-transition determination characteristic curve "B" in FIG. 3). It is possible to suppress or prevent an undesirably bigger downshift, in other words, an undesirably rapider engine-speed rise immediately after a mode transition from the normal mode to the acceleration mode, by slowing down a shift speed for a downshift in the acceleration mode when the demanded degree of the driver's acceleration intention is small (i.e., Tv≤Th_c). Hence, even when the shift-control mode can be easily brought into the acceleration mode that a higher priority is put on power performance (in particular, acceleration performance) by setting of the normal-to-acceleration mode-transition determination characteristic curve "A" close to the acceleration-to-normal mode-transition determination characteristic curve "B", somewhat lowering or leveling the normal-to-acceleration mode-transition determination characteristic curve "A" down, it is possible to prevent any sudden unpleasant feeling that the driver experiences an uncomfortable engine speed rise during downshifting.

In this manner, it is possible to realize a more smooth downshift, suited to the demanded degree of the driver's acceleration intention, by appropriately changing a shift speed for downshifting after a mode transition from the normal mode to the acceleration mode, thus ensuring adequate running performance, while attaining both improved vehicle fuel economy and reduced exhaust emission gases.

Also provided is a determination section (i.e., initial downshift completion determination section 206) for determining whether an initial downshift in the acceleration mode has been completed.

The shift control section 208 is further configured to execute the downshift at the shift speed slower than the shift speed set by the shift speed setting section 204, when it has been determined that the demanded degree of the driver's acceleration intention is lower than or equal to the predetermined value (i.e., Tv≤Th_c) and it has been determined that the initial downshift in the acceleration mode has been uncompleted.

With the previously-discussed shift-control system configuration, it is possible to slow down the shift speed for only the initial downshift in the acceleration mode, when it has been determined that the demanded degree of the driver's acceleration intention is lower than or equal to the predetermined value (i.e., Tv≤Th_c). Downshifting control after the second downshift in the acceleration mode is executed at the shift speed set by the shift speed setting section 204, without slowing down the set shift speed.

When the accelerator pedal has been redepressed after the mode transition to the acceleration mode, there is an increased tendency for the driver to intend to accelerate the vehicle. In such a case, it is possible to ensure smooth driving feel and better vehicle acceleration by inhibiting the shift speed from slowing down.

In particular, the acceleration intention determination section 201 is further configured to determine, based on the accelerator opening To, an accelerator depression speed Tv, and their predetermined threshold values Th_a and Th_b, both of which threshold values Th_a and Th_b are determined based on the vehicle speed V, whether the driver's acceleration intention is present or absent, and still further configured to determine that the driver's acceleration intention is present when a predetermined condition, defined by inequalities To≥Th_a and Tv≥Th_b, is satisfied. On the other hand, the demanded degree determination section 205 is further configured to determine the demanded degree of the driver's acceleration intention by comparing the accelerator depression speed Tv, calculated at a point of time when it has been determined that the driver's acceleration intention is present, with the predetermined threshold value Th_c, which threshold value Th_c is set to be greater than the predetermined threshold value Th_a and determined based on the accelerator opening To calculated at the same point of time, and still further configured to determine that the demanded degree of the driver's acceleration intention is less than or equal to the predetermined value, when a predetermined condition, defined by an inequality Tv≤Th_c, is satisfied.

With the previously-discussed shift-control system configuration, each of the predetermined threshold values Th_a and Th_b can be variably set or determined based on latest up-to-date information about the vehicle speed V. Thus, the presence or absence of the driver's acceleration intention can be more appropriately determined over a wide range of speed, ranging from a low-speed vehicle driving state to a high-speed vehicle driving state.

Further provided is a shift speed correction section 207 for correcting the shift speed set by the shift speed setting section 204, only when it has been determined that the demanded degree of the driver's acceleration intention is less than or equal to the predetermined value (that is, Tv≤TH_c). On the other hand, the shift control section 208 is still further configured to execute the downshift in the acceleration mode at the corrected shift speed, generated by the shift speed correction section 207, in executing the downshift in the acceleration mode at the shift speed slower than the shift speed set by the shift speed setting section 204.

Concretely, the shift speed correction section 207 is configured to execute shift-speed-correction processing for the shift speed, set by the shift speed setting section 204, only when the predetermined condition, defined by the inequality Tv≤Th_c, where Tv denotes an accelerator depression speed calculated at a point of time when it has been determined that the driver's acceleration intention is present and Th_c denotes a predetermined threshold value determined based on the accelerator opening To calculated at the same point of time, is satisfied.

With the previously-discussed shift-control system configuration, the predetermined threshold value Th_c can be variably set or determined based on latest up-to-date information about the accelerator opening To. Thus, the demanded degree of the driver's acceleration intention can be more appropriately determined over a wider range of speed, ranging from a vehicle standstill state to a high-speed vehicle driving state.

The shift speed correction section 207 is further configured to determine the corrected shift speed by multiplying the shift speed set by the shift speed setting section 204 by a correction coefficient "k", which correction coefficient "k" is determined based on the accelerator opening To at the point of time when it has been determined that the driver's acceleration intention is present.

With the previously-discussed shift-control system configuration, it is possible to easily calculate the corrected shift speed by simply multiplying the already-determined shift speed, set by the shift speed setting section 206, by the correction coefficient "k", which correction coefficient "k" is determined based on the accelerator opening To at the point of time when it has been determined that the driver's acceleration intention is present.

By the way, regarding the setting of the correction coefficient "k", another parameter may be used instead of using information about the accelerator opening To. For instance, the correction coefficient "k" may be set to be proportional to a difference Δ {=(Th_c)−Tv} between the accelerator depression speed Tv and its predetermined threshold value Th_c, so that the correction coefficient "k" increases, as the difference Δ {=(Th_c)−Tv} increases.

In the case of the previously-noted modified setting of the correction coefficient "k", the correction coefficient "k" tends to become large, as the demanded degree of the driver's acceleration intention becomes small and thus the difference Δ {=(Th_c)−Tv} between the accelerator depression speed Tv and its predetermined threshold value Th_c becomes large. Hence, it is possible to more smoothly slow down a shift speed for the initial downshift, occurring immediately after the mode transition to the acceleration mode, thereby effectively reducing a divergence (a deviation) between an actual engine-speed change during the initial downshift in the acceleration mode and an engine-speed change sensuously assumed by the driver. This eliminates or prevents any sudden unpleasant feeling that the driver experiences an uncomfortable engine speed rise during downshifting.

In the shown embodiment, in order to determine whether execution of the shift-speed-correction processing should be permitted (enabled) or inhibited (disabled), the demanded degree of the driver's acceleration intention is determined by comparing the accelerator depression speed Tv, calculated at the point of time when it has been determined that the driver's acceleration intention is present, with the predetermined threshold value Th_c, which threshold value Th_c is determined based on the accelerator opening To calculated at the same point of time.

By the way, the demanded degree of the driver's acceleration intention can be also detected or reflected by a variation ΔTo of the accelerator opening To. Hence, a predetermined threshold value Th_e for accelerator-opening variation ΔTo is predefined or preprogrammed for every vehicle speed V. In order to enable (permit) or disable (inhibit) the shift-speed-correction processing, the demanded degree determination section 205 may be configured to determine that the demanded degree of the driver's acceleration intention is small, only when a predetermined condition, defined by an inequality ΔTo≤Th_e, is satisfied.

Furthermore, the demanded degree determination section 205 may be configured to determine that the demanded degree of the driver's acceleration intention is small, only when a predetermined condition, defined by two inequalities Tv≤Th_c and ΔTo≤Th_e, is satisfied.

Furthermore, in the shown embodiment, step S101 (i.e., acceleration intention determination section 201) determines that the driver's intention to accelerate is present, when a predetermined condition, defined by two inequalities To≥Th_a and Tv≥Th_b, is satisfied. In lieu thereof, acceleration intention determination section 201 may be configured to determine that the driver's intention to accelerate is present, when either one of these inequalities To≥Th_a and Tv≥Th_b, is satisfied.

Moreover, in the shown embodiment, an automotive belt-drive continuously variable automatic transmission is exemplified as the continuously variable transmission (CVT), to which the shift control apparatus of the embodiment can be applied. In lieu thereof, the fundamental concept of the invention may be applied to another type of continuously variable transmission, for example a toroidal continuously variable transmission.

The entire contents of Japanese Patent Application No. 2011-258363 (filed Nov. 26, 2011) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A shift control apparatus of a continuously variable transmission configured to steplessly vary a torque inputted from an engine to an input rotating member and configured to transmit the steplessly-varied torque to an output rotating member, comprising:

an acceleration intention determination section configured to determine whether a driver's acceleration intention is present or absent;

a shift mode setting section configured to set a shift-control mode of the continuously variable transmission to an acceleration mode in which a target rotational speed of the input rotating member is set to a higher rotational speed than that of a normal mode, upon determination that the driver's acceleration intention is present;

a target transmission ratio setting section configured to set a target transmission ratio based on an accelerator opening and a vehicle speed from a map provided for each of the normal mode and the acceleration mode;

a shift speed setting section configured to set a shift speed based on the target transmission ratio and the vehicle speed;

a shift control section configured to control a shift of the continuously variable transmission based on at least the target transmission ratio and the shift speed set by the shift speed setting section; and a demanded degree determination section configured to determine a demanded degree of the driver's acceleration intention when the shift-control mode has been set to the acceleration mode, wherein the shift control section is further configured execute a downshift in the acceleration mode at a shift speed slower than the shift speed set by the shift speed setting section, upon determination that the demanded degree of the driver's acceleration intention is lower than or equal to a predetermined value, and to execute the downshift in the acceleration mode at the shift speed set by the shift speed setting section, upon determination that the demanded degree of the driver's acceleration intention is higher than the predetermined value, wherein the acceleration intention determination section is further configured to determine, based on the accelerator opening and a first predetermined threshold value, which first predetermined threshold value is determined based on the vehicle speed, whether the driver's acceleration intention is present or absent, and further configured to determine that the driver's acceleration intention is present when a first predetermined condition is satisfied, wherein the first predetermined condition is satisfied when the accelerator opening is greater than or equal to the first predetermined threshold value, wherein the demanded degree determination section is further configured to determine the demanded degree of the driver's acceleration intention by comparing an accelerator depression speed, calculated at a time when the driver's acceleration intention is determined to be present, with a second predetermined threshold value, which second predetermined threshold value is set to be greater than the first predetermined threshold value and determined based on the accelerator opening calculated at the same time as the accelerator depression speed, wherein the demanded degree determination section is further configured to determine that the demanded degree of the driver's acceleration intention is less than or equal to the predetermined value when a second predetermined condition is satisfied, and wherein the second predetermined condition is satisfied when the accelerator depression speed is less than or equal to the second predetermined threshold value.

2. The shift control apparatus as claimed in claim 1, further comprising:

a determination section for determining whether an initial downshift in the acceleration mode has been completed, wherein the shift control section is further configured to execute the downshift at the shift speed slower than the shift speed set by the shift speed setting section, upon determination that the demanded degree of the driver's acceleration intention is lower than or equal to the predetermined value and that the initial downshift in the acceleration mode is unperformed.

3. The shift control apparatus as claimed in claim 1, wherein:

the acceleration intention determination section is further configured to determine, based on the accelerator opening, the accelerator depression speed, the first predetermined threshold value and a third predetermined threshold value, the first and third predetermined threshold values being determined based on the vehicle speed, whether the driver's acceleration intention is present or absent, and to determine that the driver's intention is present when a third predetermined condition is satisfied; and the third predetermined condition is satisfied when the first predetermined condition is satisfied and the accelerator depression speed is greater than or equal to the third predetermined threshold value.

4. The shift control apparatus as claimed in claim 1, further comprising:

a shift speed correction section configured to correct the shift speed set by the shift speed setting section, only when the demanded degree of the driver's acceleration intention is less than or equal to the predetermined value, wherein, in executing the downshift in the acceleration mode at the shift speed, slower than the shift speed set by the shift speed setting section, the shift control section is further configured to execute the downshift in the acceleration mode at the shift speed corrected by the shift speed correction section.

5. The shift control apparatus as claimed in claim 4, wherein:

the shift speed correction section is configured to correct the shift speed for the downshift in the acceleration mode upon determination that the demanded degree of the driver's acceleration intention is less than or equal to the second predetermined threshold value, to a shift speed slower than the shift speed for the downshift in the acceleration mode upon determination that the demanded degree of the driver's acceleration intention exceeds the second predetermined threshold value.

6. The shift control apparatus as claimed in claim 4, wherein:

the shift speed correction section is further configured to determine the corrected shift speed by multiplying the shift speed set by the shift speed setting section by a correction coefficient, which correction coefficient is determined based on the accelerator opening at the time when the driver's acceleration intention is determined to be present.

7. A shift control apparatus of a continuously variable transmission configured to steplessly vary a torque inputted from an engine to an input rotating member and configured to transmit the steplessly-varied torque to an output rotating member, comprising:

an acceleration intention determination section for determining whether a driver's acceleration intention is present or absent;

a shift mode setting section for setting a shift-control mode of the continuously variable transmission to an acceleration mode in which a target rotational speed of the input rotating member is set to a higher rotational speed than that of a normal mode, when it has been determined that the driver's acceleration intention is present;

a target transmission ratio setting section for setting a target transmission ratio based on an accelerator opening To and a vehicle speed V from a map provided for each of the normal mode and the acceleration mode;

a shift speed setting section for setting a shift speed based on the target transmission ratio and the vehicle speed V;

a shift control section for controlling a shift of the continuously variable transmission based on at least the target transmission ratio and the shift speed set by the shift speed setting section; and a demanded degree determination section for determining a demanded degree of the driver's acceleration intention when the shift-control mode has been set to the acceleration mode, wherein:

the shift control section is also configured to execute a downshift in the acceleration mode at a shift speed slower than the shift speed set by the shift speed setting section, when it has been determined that the demanded degree of the driver's acceleration intention is lower than or equal to a predetermined value, and further configured to execute the downshift in the acceleration mode at the shift speed set by the shift speed setting section, when it has been determined that the demanded degree of the driver's acceleration intention is higher than the predetermined value;

the acceleration intention determination section is further configured to determine, based on the accelerator opening To, an accelerator depression speed Tv, and their predetermined threshold values Th_a and Th_b, both of which threshold values Th_a and Th_b are determined based on the vehicle speed V, whether the driver's acceleration intention is present or absent, and still further configured to determine that the driver's acceleration intention is present when a predetermined condition, defined by inequalities To≥Th_a and Tv≥Th_b, is satisfied; and the demanded degree determination section is further configured to determine the demanded degree of the driver's acceleration intention by comparing the accelerator depression speed Tv, calculated at a point of time when it has been determined that the driver's acceleration intention is present, with the predetermined threshold value Th_c, which threshold value Th_c is set to be greater than the predetermined threshold value Th_a and determined based on the accelerator opening To calculated at the same point of time, and still further configured to determine that the demanded degree of the driver's acceleration intention is less than or equal to the predetermined value, when a predetermined condition, defined by an inequality Tv≤Th_c, is satisfied.

* * * * *